Aug. 25, 1931.   J. D. DURANT   1,820,651
LAMP MOUNTING AND CLAMP
Filed July 21, 1930
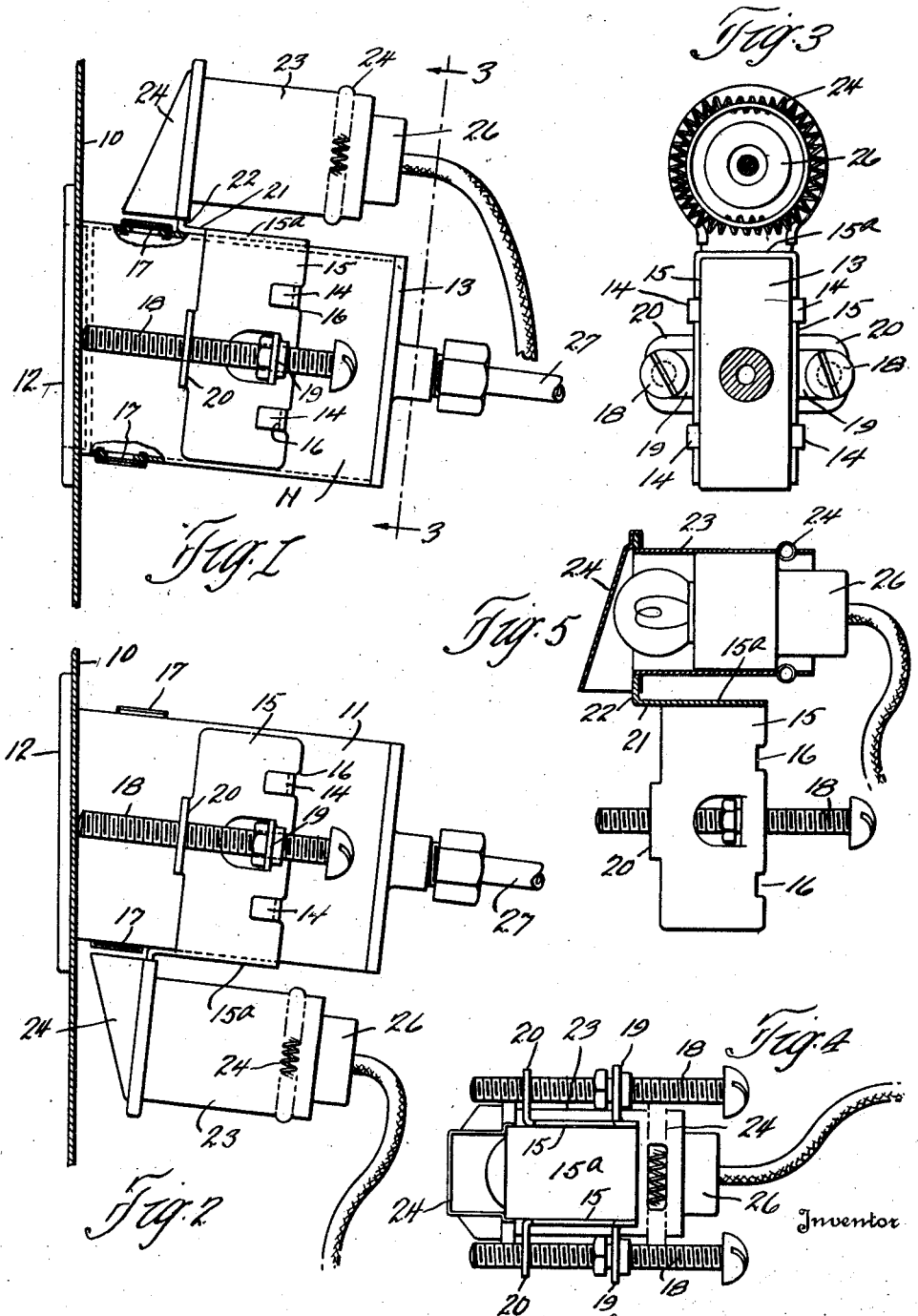

Patented Aug. 25, 1931

1,820,651

UNITED STATES PATENT OFFICE

JOHN D. DURANT, OF DETROIT, MICHIGAN, ASSIGNOR TO THE GABRIEL COMPANY, OF CLEVELAND, OHIO, A CORPORATION OF OHIO

LAMP MOUNTING AND CLAMP

Application filed July 21, 1930. Serial No. 469,495.

This invention relates to a gauge or indicator which is adapted to be inset into a panel, that is supported behind a panel, and having the registering portions visible on the front of the panel or wall. The particular use for which the invention is now intended is for a gauge or registering device adapted to be read on the dash of an automobile. One object of the invention is to provide a means for holding such a gauge or indicator firmly in position on the dash and to combine with the means for so holding it a means for supporting a lamp to illuminate the registering portion whereby the same may be read at night. A further object is to attain these results by means of a device which is comparatively cheap of manufacture, convenient to assemble, which may be assembled with the lamp on either side of the indicator shell and which will be peculiarly efficient and satisfactory in use. Other and more specific objects will appear from the following description and the drawings.

Fig. 1 shows a side elevation of my improved device in position of use; Fig. 2 shows the same in reverse position, that is, with the lamp supported at the bottom of the indicator shell instead of at the top thereof; Fig. 3 is a rear elevation of the device shown in Fig. 1; Fig. 4 is a bottom plan view of the lamp socket and clamping mechanism removed from the indicator shell and Fig. 5 is a sectional view of the same.

In the drawings I have illustrated the dash panel or wall through which the indicator shell is inserted by the numeral 10. The indicator shell 11 is provided with flanges adapted to bear on the front of the dash and these are shown covered by a finishing frame 12. The casting 13 which carries the mechanism of the indicator or gauge is of conventional construction and forms no part of this invention and the shell 11 is provided on each vertical side thereof with struck-out tongues 14 which constitute abutment means adapted to be engaged by the U-shaped member 15 at the notches 16 thereof to constrain motion of said member along the shell. The abutment means 14 are spaced at equal distances from the adjacent edges of the shell 11. The shell 11 is provided on the upper and lower walls thereof with windows 17 through which light may pass to illuminate the registering portions of the indicator or gauge.

The U-shaped member 15 together with screws 18 constitute an expansible shell anchoring means for holding the indicator in fixed position relative to the dash. Each leg of the U-shaped member 15 is provided at the central portion on each side with an up-struck ear 19 which is provided with an opening threaded to receive the screws 18. Also on each leg of the U-shaped portion there is provided an up-standing lug 20 which is drilled to receive the screws 18 and form a guide therefor. Integral with the yoke portion 15$^a$ of the U-shaped member is a bracket 21 having an upstanding portion 22 upon which is mounted a lamp-receiving means comprising a cylindrical socket 23 and an angularly extending conduit like member 24 through which light may pass to the window 17. The cylindrical portion 23 is provided with transverse slots adapted to receive the portion of a spring 24. An electric lamp or auxiliary socket 26 therefor may be inserted in the cylindrical member 23 and will be gripped and held frictionally in position by the spring 24.

In assembling the indicator or gauge shell including the indicator mechanism and casting 13 is as a unit inserted through an opening in the dash 10 and connected by suitable means to a tube 27 or other suitable lead to whatever mechanism or device the indicator is associated with. The U-shaped member 15 with screws 18 retracted is then placed in position embracing the gauge or indicator shell 11 and the screws 18 are then turned and bear against the dash 10 to hold the indicator firmly anchored in position with respect to the dash. The position of the tongues 14 with respect to the window 17 will be such that when the U-shaped member 15 engages therewith the conduit like portion 24 will be positioned opposite one of the windows 17 whereby the same may be illuminated from the lamp in the socket 23. The member 26 may then be inserted and the installation will be complete.

It is preferred that the interior surface of the member 24 will be dull whereby a diffused light from the lamp will be transmitted to the recording portions of the indicator or gauge whereby the same will not be too brilliant or glaring.

From the foregoing it will be evident that I have devised a combined anchoring and illuminating means for an indicator and while I have shown and described one illustrative embodiment, I wish it understood that my invention is not limited to the embodiment disclosed but may be carried out in numerous varying forms and that I am limited only in accordance with the appended claims.

Having thus described my invention, what I claim is:

1. In combination with an indicator shell and the registering portions of the indicator, said shell having means therein through which light may pass to illuminate said portions, removable means for mounting an electric lamp adjacent said first means in illuminating relation with said portions, said removable means including a casing to contain said lamp and means removably mounted on said shell and supporting said casing thereon, and means carried by said shell for positioning said last means with respect thereto, said casing including means for directing light from said lamp upon said first means to illuminate said registering portions.

2. In combination with an indicator shell and the registering portions of the indicator, said shell having means therein through which light may pass to illuminate said portions, removable means for mounting an electric lamp adjacent said first means in illuminating relation with said portions, said removable means including a casing to contain said lamp and means removably mounted on said shell and supporting said casing thereon, and means carried by said shell for positioning said last means with respect thereto, said casing including means for directing light from said lamp upon said first means to illuminate said registering portions, said removable means also including a portion of the casing extending at an angle to said shell and terminating adjacent said first means.

3. An indicator including a shell and registering means associated therewith, a flange on said shell adapted to abut the edges of an opening in a wall or plate through which the remainder of said shell may be passed, abutment means on said shell, and extensible means tensionally positioned between said abutment means and said wall or plate to maintain said indicator in position in said opening.

4. An indicator including a shell and registering means associated therewith, a flange on said shell adapted to abut the edges of an opening in a wall or plate through which the remainder of said shell may be passed, abutment means on said shell, extensible means tensionally positioned between said abutment means and said wall or plate to maintain said indicator in position in said opening, said extensible means including a U-shaped member embracing said shell and engaging said abutment means, and a screw threadedly carried by said U-shaped member on each side thereof.

5. An indicator including a shell and registering means associated therewith, a flange on said shell adapted to abut the edges of an opening in a wall or plate through which the remainder of said shell may be passed, abutment means on said shell, extensible means tensionally positioned between said abutment means and said wall or plate to maintain said indicator in position in said opening, and a lamp support carried by said extensible means.

6. An indicator including a shell and registering means associated therewith, a flange on said shell adapted to abut the edges of an opening in a wall or plate through which the remainder of said shell may be passed, abutment means on said shell, extensible means tensionally positioned between said abutment means and said wall or plate to maintain said indicator in position in said opening, said extensible means including a U-shaped member embracing said shell and engaging said abutment means, a screw threadedly carried by said U-shaped member on each side thereof, and a lamp support carried by said extensible means.

7. An indicator including a shell and registering means associated therewith, a flange on said shell adapted to abut the edges of an opening in a wall or plate through which the remainder of said shell may be passed, abutment means on said shell, extensible means tensionally positioned between said abutment means and said wall or plate to maintain said indicator in position in said opening, said extensible means including a U-shaped member embracing said shell and engaging said abutment means, a screw threadedly carried by said U-shaped membed on each side thereof, and a lamp support carried by said extensible means, said support including a bracket fixedly carried by said U-shaped member and having a lamp socket attached thereto.

8. In a device of the type described, an indicator shell having a flange thereon, windows in two opposite faces thereof, a combined shell anchoring and lamp supporting means embracing said shell, abutment means on said shell against which said means is adapted to engage, said device including means whereby said shell anchoring and lamp supporting means may be positioned to anchor said shell and illuminate either of said windows.

9. As an article of manufacture, a U-shaped member having a struck-out ear and an upturned lug positioned centrally of each leg thereof and a bracket fixedly carried by the yoke portion and having an upstanding part, a threaded opening in each ear, an opening in each lug aligned with said threaded opening, notches in each leg of the U-shaped member, screws threaded through said ears and passing through said lugs, and a lamp receiving means carried on said upstanding part, said last means including a lamp socket portion and a conduit-like portion extending at an angle thereto through which light may be transmitted.

10. As an article of manufacture, a U-shaped member having a struck-out ear and an upturned lug and a bracket fixedly carried by the yoke portion and having an upstanding part, a threaded opening in each ear, an opening in each lug aligned with said threaded opening, notches in each leg of the U-shaped member, screws threaded through said ears and passing through said lugs, and a lamp receiving means carried on said upstanding part, said last means including a lamp socket portion and a conduit-like portion extending at an angle thereto through which light may be transmitted.

11. As an article of manufacture a U-shaped member having a struck-out ear and an upturned lug positioned centrally of each leg thereof and a bracket fixedly carried by the yoke portion and having an upstanding part, a threaded opening in each ear, an opening in each lug aligned with said threaded opening, screws threaded through said ears and passing through said lugs, and a lamp receiving means carried on said upstanding part, said last means including a lamp socket portion and a conduit-like portion extending at an angle thereto through which light may be transmitted.

12. As an article of manufacture, a U-shaped member having a struck-out ear and an upturned lug and a bracket fixedly carried by the yoke portion and having an upstanding part, a threaded opening in each ear, an opening in each lug aligned with said threaded opening, screws threaded through said ears and passing through said lugs, and a lamp receiving means carried on said upstanding part, said last means including a lamp socket portion and a conduit-like portion extending at an angle thereto through which light may be transmitted.

In testimony whereof, I hereunto affix my signature.

JOHN D. DURANT.